T. H. SLEDGE.
TRANSPOSING PIANO.
APPLICATION FILED NOV. 4, 1916.
1,248,736.
Patented Dec. 4, 1917.
3 SHEETS—SHEET 1.
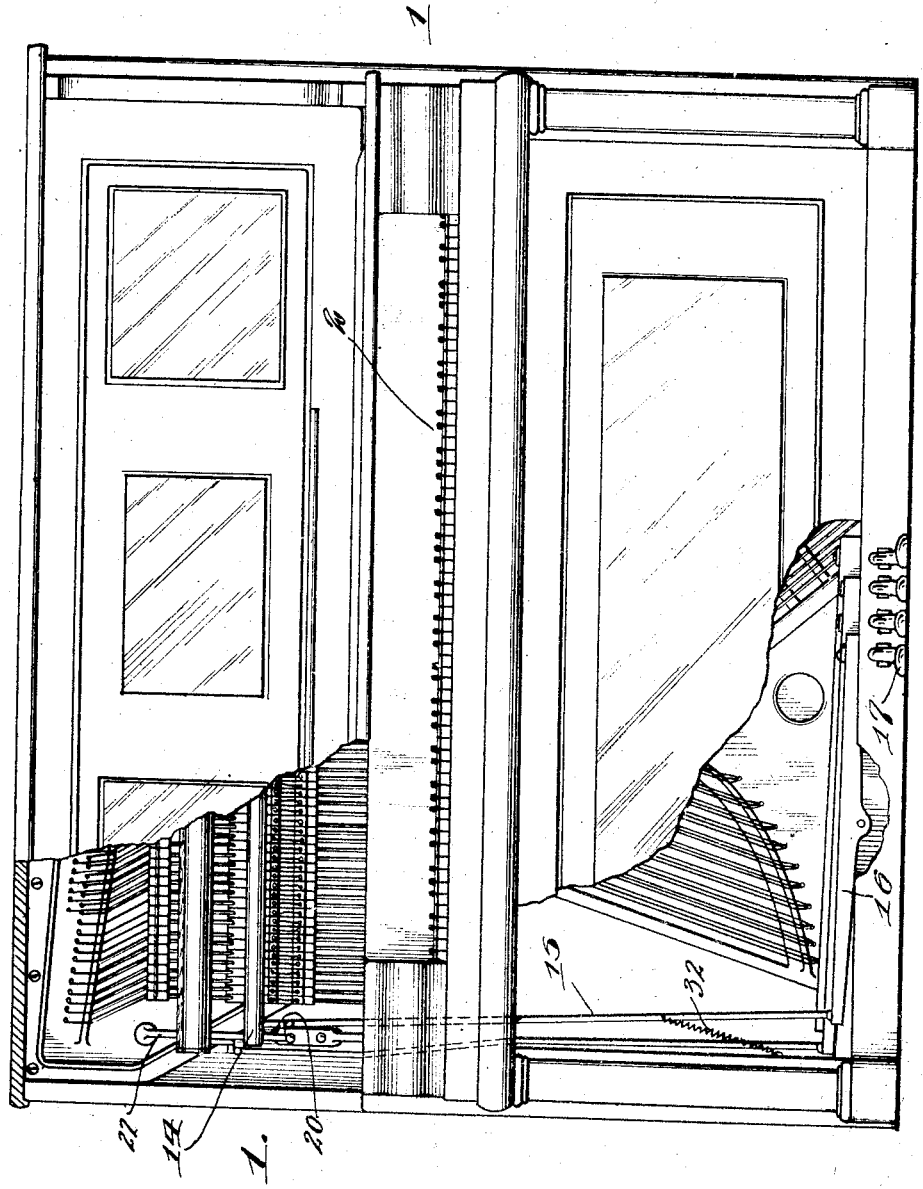
WITNESSES
INVENTOR
T. H. Sledge.
BY
ATTORNEY

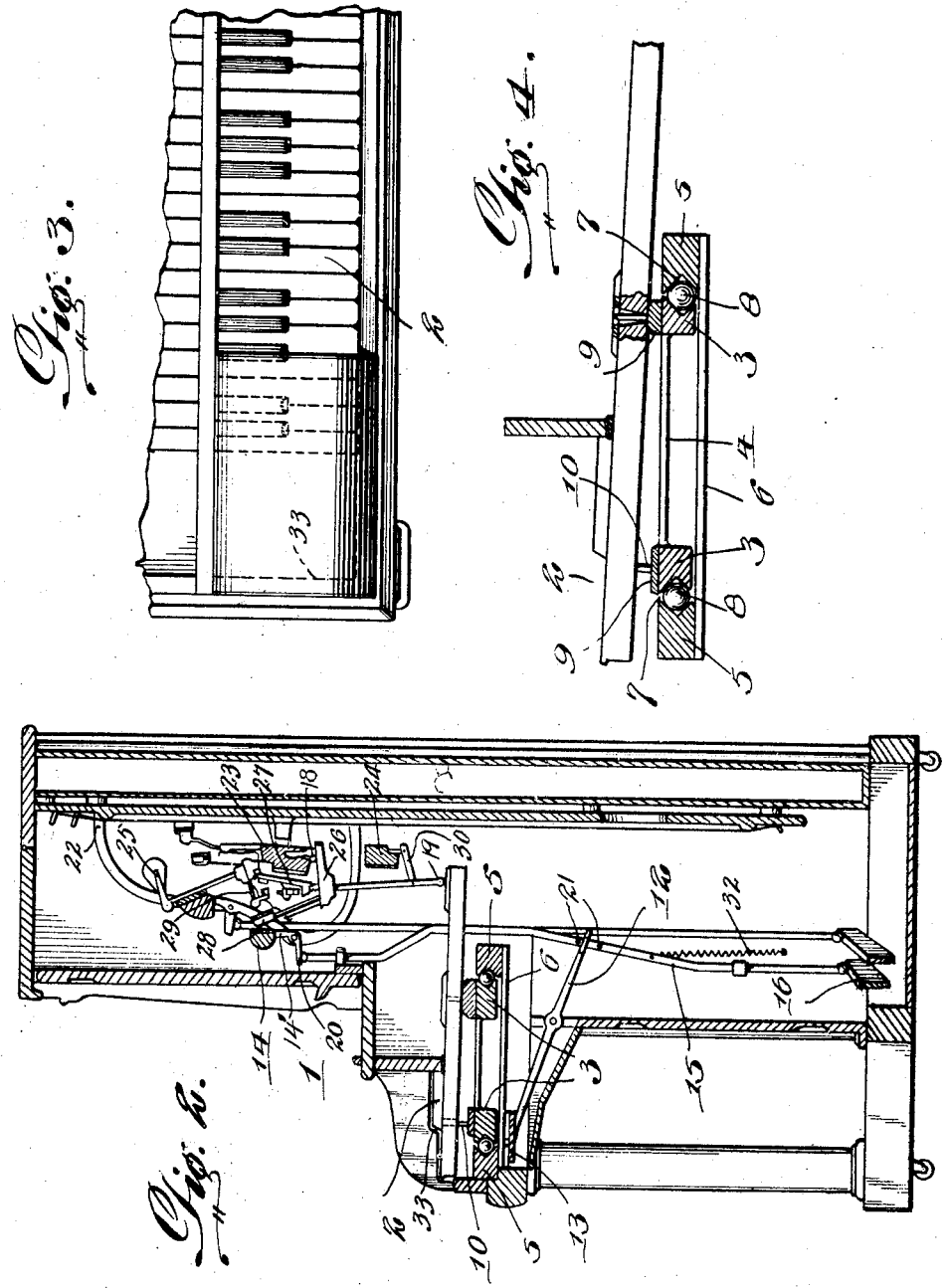

T. H. SLEDGE.
TRANSPOSING PIANO.
APPLICATION FILED NOV. 4, 1916.
1,248,736.
Patented Dec. 4, 1917.
3 SHEETS—SHEET 3.
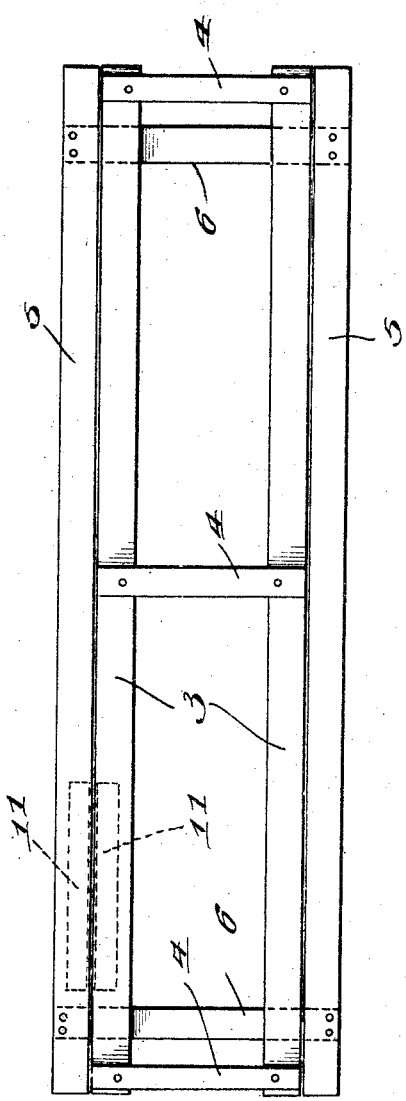
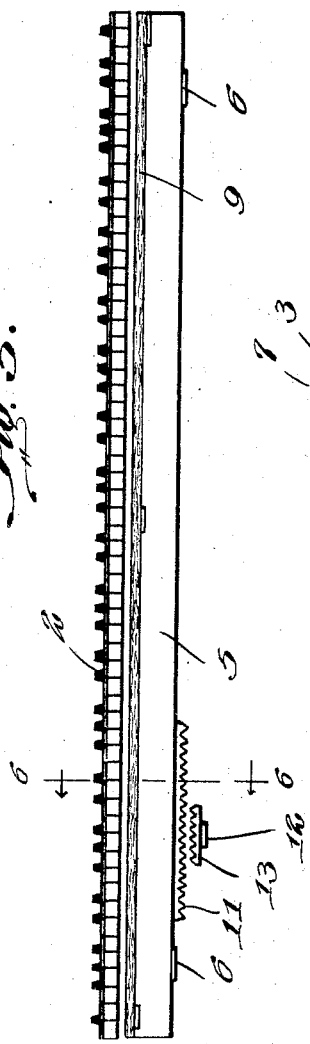
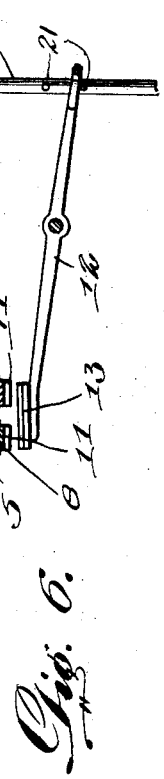
WITNESSES
INVENTOR
*T. H. Sledge.*
BY *Victor J. Evans.*
ATTORNEY

UNITED STATES PATENT OFFICE.

THOMAS H. SLEDGE, OF MONTGOMERY, ALABAMA.

TRANSPOSING-PIANO.

1,248,736. Specification of Letters Patent. Patented Dec. 4, 1917.

Application filed November 4, 1916. Serial No. 129,555.

*To all whom it may concern:*

Be it known that I, THOMAS H. SLEDGE, a citizen of the United States, residing at Montgomery, in the county of Montgomery and State of Alabama, have invented new and useful Improvements in Transposing-Pianos, of which the following is a specification.

This invention relates to improvements in piano construction and has particular application to a longitudinally movable keyboard for pianos.

In carrying out the present invention, it is my purpose to provide a piano wherein by means of a movable keyboard the piano may be played in any key, using the same fingering and the same keys in each octave.

It is also my purpose to provide a piano construction wherein the keyboard will be capable of longitudinal sliding movement and under the control of locking mechanism for holding the keyboard in adjusted position, means being employed for relieving the keyboard of the weight of the hammers when it is desired to shift the keyboard so that the keyboard may be moved longitudinally easily, and wherein the keyboard may be unlocked and relieved of the weight of the hammers simultaneously.

With the above and other objects in view, the invention consists in the construction, combination and arrangement of parts hereinafter set forth in and falling within the scope of the claims.

In the accompanying drawings;

Figure 1 is a fragmentary front elevation of a piano constructed in accordance with the present invention, the front board of the casing being partly broken away.

Fig. 2 is a fragmentary cross sectional view therethrough.

Fig. 3 is a top plan view of the keyboard and casing therefor showing certain of the end keys as covered.

Fig. 4 is an enlarged cross sectional view through the keyboard showing the mounting therefor.

Fig. 5 is an enlarged front elevation of the keyboard showing the locking means therefor.

Fig. 6 is a cross sectional view on the line 6—6 of Fig. 5.

Fig. 7 is a top plan view of the carriage for the keyboard and the guides for the carriage.

Referring now to the drawings in detail, 1 designates a piano embodying a case of any suitable construction, a sounding board and an action of any suitable or preferred type. 2 designates the keyboard of the piano and, in accordance with the present invention, the keyboard embodies sixty white and forty-two black keys making a total of one hundred and two keys. As shown, one-half octave (four white keys and corresponding black keys) at each end of the keyboard is covered by the casing at the end of the keyboard, thus leaving eighty-eight keys, (the standard keyboard) visible to be played. The case of the piano at the ends of the keyboard is formed with openings 33 so that the keyboard may be moved longitudinally in either direction to cover and uncover the keys at either end of the keyboard and to change the position of the keys with respect to the actions so that the piano may be played in any key without transposing the music. The keyboard 2 is mounted upon a carriage comprising longitudinal bars 3 spaced apart in parallelism and connected to each other by means of cross bars 4 and this carriage is slidably mounted within longitudinally extending guide bars 5, arranged upon the outer sides of the respective bars 3 and connected to each other by means of cross bars 6 arranged below the carriage. The confronting edges of the adjacent bars 3 and 5 are formed with ways 7 and in these ways are mounted ball bearings 8 so that the carriage may be moved longitudinally between the guide bars easily to shift the keyboard. Secured to the upper sides of the bars 3 of the carriage are strips 9 extending longitudinally of the bars, and the keys are pivoted upon the strips carried by the rear bar of the carriage, while projecting upwardly from the strip carried by the front bar are pins 10 that engage in recesses formed in the lower sides of the respective keys. Secured to the lower sides of adjacent bars 3 and 5 at the front of the keyboard are rack bars 11, while pivoted between its ends below the keyboard is a lever 12 arranged at right angles to the rack bars 11 and having the outer end equipped with a rack 13 adapted to engage the rack bars 11 to hold the carriage of the keyboard against sliding movement in the guide bars.

The action of the piano is of usual construction and comprises a frame 22 having an upper rail 23 and a lower rail 24, hammers 25 pivotally mounted upon said upper rail, wippens 26 having their rear ends pivotally mounted at 18 on the lower side of said upper rail, jacks 27 mounted on said wippens and engaging the hammers 25, abstracts 19 pivotally mounted on said wippens near the outer ends thereof and extending downwardly therefrom and resting upon the keys of the keyboard 2, back checks 28 mounted on the outer ends of said wippens and extending upwardly therefrom and adapted to engage counter checks 29 mounted on said hammers, and links 30 having their respective ends pivotally mounted on said lower rail 24 and said abstracts 19. It will be noted that, as the keys of the keyboard are depressed, the inner ends thereof are raised. This motion is transmitted through the abstracts 19 to the wippens 26 which move upwardly upon their pivots 18, and in turn move the hammers 25 inwardly to strike the strings 31 through the medium of the jacks 27. The back checks 28 swing inwardly with the upward movement of said wippens to engage the counter checks 29 of the hammers in the usual manner.

Extending across the piano in front of the action is a bar 14, which is secured to the upper ends of arms 14′, said arms having their lower ends pivotally mounted at respective extensions of the frame 22. One of said arms 14′ has a horizontal extension 20 projecting outwardly therefrom. A vertical rod 15 has its upper end pivotally secured to the extension 20, and has its lower end pivotally secured to a horizontal lever 16, pivoted in the piano casing and connected to a pedal 17 mounted in juxtaposition to the usual pedals of the piano. A tension spring 32 has its one end connected to the rod 15, and its other end connected to the piano casing to normally hold said rod in its lower position. The rod 15 engages the inner end of the lever 12 by means of projections 21, formed on said rod, confining said end therebetween.

In practice, when it is desired to shift the keyboard, the pedal 17 is depressed, thereby transmitting motion through the bar 16 and the rod 15 to the bar 14 which is moved toward the rear of the piano and engages the back checks 28, which are also moved toward the rear of the piano, the wippens 26 being swung upwardly upon their pivots 18 and their abstracts 19 lifted off of the keys of the keyboard 2. In the movement of this rod 15, the lever 12 is actuated to disengage the plate 13 from the rack bars 11, thereby releasing the carriage so that the keyboard may be shifted by hand to the desired position. Upon the release of the pedal 17 the spring 32 moves the rod 15 to its lower position and the bar 14 is returned to normal position out of engagement with back checks 28, which are allowed to return to their normal position whereby said wippens 26 swing downwardly upon said pivots 18, and the abstracts 19 again engage the keys of the keyboard 2 and the plate 13 reëngages the rack bars 12 to lock the carriage against movement.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:

1. A transposing piano comprising a longitudinally movable keyboard, means for raising the abstracts out of contact with said keyboard, a rack disposed on said keyboard, a second rack disposed upon an adjacent stationary part of the piano, a pivoted lever having a rack on one end normally engaging the above mentioned racks, and a connection between said means for raising the abstracts and said lever whereby the racks may be disengaged when said abstracts are moved out of contact with said keyboard.

2. A transposing piano comprising stationary guide bars, a keyboard mounted for longitudinal movement on said stationary guide bars, a rack on said keyboard, a second rack mounted on an adjacent guide bar, a third rack engageable with said first and second mentioned racks, and means for engaging said third rack with said first and second racks.

In testimony whereof I affix my signature.

THOMAS H. SLEDGE.

Copies of this patent may be obtained for five cents each, by addressing the "Commissioner of Patents, Washington, D. C."